(12) United States Patent
Hillesund et al.

(10) Patent No.: US 7,293,520 B2
(45) Date of Patent: *Nov. 13, 2007

(54) CONTROL SYSTEM FOR POSITIONING OF A MARINE SEISMIC STREAMERS

(75) Inventors: Oyvind Hillesund, Histon (GB); Simon Hastings Bittleston, Bury St Edmunds (GB)

(73) Assignee: WesternGeco, L.L.C., Houston, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 11/455,042

(22) Filed: Jun. 16, 2006

(65) Prior Publication Data

US 2006/0231007 A1 Oct. 19, 2006

(51) Int. Cl.
*B63B 21/66* (2006.01)
*G01V 1/38* (2006.01)

(52) U.S. Cl. .............................. 114/244; 367/19

(58) Field of Classification Search ............... 114/162, 114/163, 242, 244, 246, 253
See application file for complete search history.

(56) References Cited

U.S. PATENT DOCUMENTS

| | | | |
|---|---|---|---|
| 3,375,800 A | 4/1968 | Cole et al. | 114/235 |
| 3,412,705 A | 11/1968 | Nesson | 115/12 |
| 3,434,446 A | 3/1969 | Cole | 114/235 |
| 3,440,992 A | 4/1969 | Chance | 114/235 |
| 3,560,912 A | 2/1971 | Spink et al. | 340/3 |
| 3,605,674 A | 9/1971 | Weese | 114/235 B |
| 3,648,642 A | 3/1972 | Fetrow et al. | 114/235 |
| 3,774,570 A | 11/1973 | Pearson | 114/235 B |
| 3,896,756 A | 7/1975 | Pearson et al. | 114/235 B |
| 3,931,608 A | 1/1976 | Cole | 367/17 |
| 3,943,483 A | 3/1976 | Strange | 340/7 PC |
| 3,961,303 A | 6/1976 | Paitson | 367/17 |
| 4,033,278 A | 7/1977 | Waters | 114/245 |
| 4,063,213 A | 12/1977 | Itria et al. | 367/17 |
| 4,087,780 A | 5/1978 | Itria et al. | 367/17 |
| 4,222,340 A | 9/1980 | Cole | 114/245 |
| 4,227,479 A | 10/1980 | Gertler et al. | 114/312 |
| 4,290,124 A | 9/1981 | Cole | 367/18 |

(Continued)

FOREIGN PATENT DOCUMENTS

AU 199853305 12/1997

(Continued)

*Primary Examiner*—Jesús D Sotelo
(74) *Attorney, Agent, or Firm*—Liangang (Mark) Ye; Jeffrey E. Griffin

(57) ABSTRACT

A method of controlling a streamer positioning device (18) configured to be attached to a marine seismic streamer (12) and towed by seismic survey vessel (10) and having a wing and a wing motor for changing the orientation of the wing. The method includes the steps of: obtaining an estimated velocity of the streamer positioning device, calculating a desired change in the orientation of the wing using the estimated velocity of the streamer positioning device, and actuating the wing motor to produce the desired change in the orientation of the wing. The invention also involves an apparatus for controlling a streamer positioning device including means for obtaining an estimated velocity of the streamer positioning device, means for calculating a desired change in the orientation of the wing using the estimated velocity of the streamer positioning device, and means for actuating the wing motor to produce the desired change in the orientation of the wing.

34 Claims, 3 Drawing Sheets

U.S. PATENT DOCUMENTS

| | | | |
|---|---|---|---|
| 4,313,392 A | 2/1982 | Guenther et al. | 114/244 |
| 4,323,989 A | 4/1982 | Huckabee et al. | 367/17 |
| 4,404,664 A | 9/1983 | Zachariadis | 367/19 |
| 4,463,701 A | 8/1984 | Pickett et al. | 114/245 |
| 4,484,534 A | 11/1984 | Thillaye du Boullay | 114/244 |
| 4,694,435 A | 9/1987 | Magneville | 367/17 |
| 4,709,355 A | 11/1987 | Woods et al. | 367/16 |
| 4,711,194 A | 12/1987 | Fowler | 114/245 |
| 4,723,501 A | 2/1988 | Hovden et al. | 114/144 B |
| 4,729,333 A | 3/1988 | Kirby et al. | 114/244 |
| 4,745,583 A | 5/1988 | Motal | 367/18 |
| 4,766,441 A | 8/1988 | Phillips | 343/709 |
| 4,767,183 A | 8/1988 | Martin | 350/96.23 |
| 4,843,996 A | 7/1989 | Darche | 114/245 |
| 4,890,568 A * | 1/1990 | Dolengowski | 114/246 |
| 4,890,569 A | 1/1990 | Givens | 114/349 |
| 4,912,684 A | 3/1990 | Fowler | 367/76 |
| 4,992,990 A | 2/1991 | Langeland | 367/19 |
| 5,042,413 A | 8/1991 | Benoit | 114/244 |
| 5,052,814 A | 10/1991 | Stubblefield | 367/15 |
| 5,402,745 A | 4/1995 | Wood | 114/244 |
| 5,443,027 A | 8/1995 | Owsley et al. | 114/244 |
| 5,507,243 A | 4/1996 | Williams et al. | 114/245 |
| 5,517,202 A | 5/1996 | Patel | 343/709 |
| 5,517,463 A | 5/1996 | Hornbostel et al. | 367/13 |
| 5,529,011 A | 6/1996 | Williams, Jr. | 114/245 |
| 5,532,975 A | 7/1996 | Elholm | 367/16 |
| 5,619,474 A | 4/1997 | Kuche | 367/17 |
| 5,642,330 A | 6/1997 | Santopietro | 367/131 |
| 5,790,472 A | 8/1998 | Workman et al. | 367/19 |
| 5,913,280 A * | 6/1999 | Nielsen et al. | 114/242 |
| 5,973,995 A * | 10/1999 | Walker et al. | 367/20 |
| 6,011,752 A | 1/2000 | Ambs et al. | 367/17 |
| 6,011,753 A | 1/2000 | Chien | 367/21 |
| 6,016,286 A | 1/2000 | Olivier et al. | 367/17 |
| 6,144,342 A | 11/2000 | Bertheas et al. | 343/709 |
| 6,459,653 B1 | 10/2002 | Kuche | 367/17 |
| 6,525,992 B1 | 2/2003 | Olivier et al. | 367/17 |
| 6,549,653 B1 | 4/2003 | Osawa et al. | 382/162 |
| 6,879,542 B2 | 4/2005 | Soreau et al. | 367/17 |
| 6,932,017 B1 * | 8/2005 | Hillesund et al. | 114/244 |

FOREIGN PATENT DOCUMENTS

| | | |
|---|---|---|
| AU | 734810 B | 6/2001 |
| CA | 2270719 | 12/1997 |
| DE | 69702673 T | 4/2001 |
| EP | 0193215 | 1/1986 |
| EP | 0319716 | 6/1989 |
| EP | 0321705 | 6/1989 |
| EP | 0525391 | 2/1993 |
| EP | 0390987 | 12/1993 |
| EP | 0613025 | 8/1994 |
| EP | 0581441 | 8/1997 |
| EP | 0909701 | 1/2003 |
| GB | 2093610 | 9/1982 |
| GB | 2122562 | 1/1984 |
| GB | 2320706 | 7/1998 |
| GB | 2331971 | 6/1999 |
| GB | 2342081 | 4/2000 |
| NO | 992701 | 6/1999 |
| WO | WO95/31735 | 11/1995 |
| WO | WO96/21163 | 7/1996 |
| WO | WO97/11395 | 3/1997 |
| WO | WO97/30361 | 8/1997 |
| WO | WO97/45006 | 12/1997 |
| WO | WO98/28636 | 7/1998 |
| WO | WO99/04293 | 1/1999 |

* cited by examiner

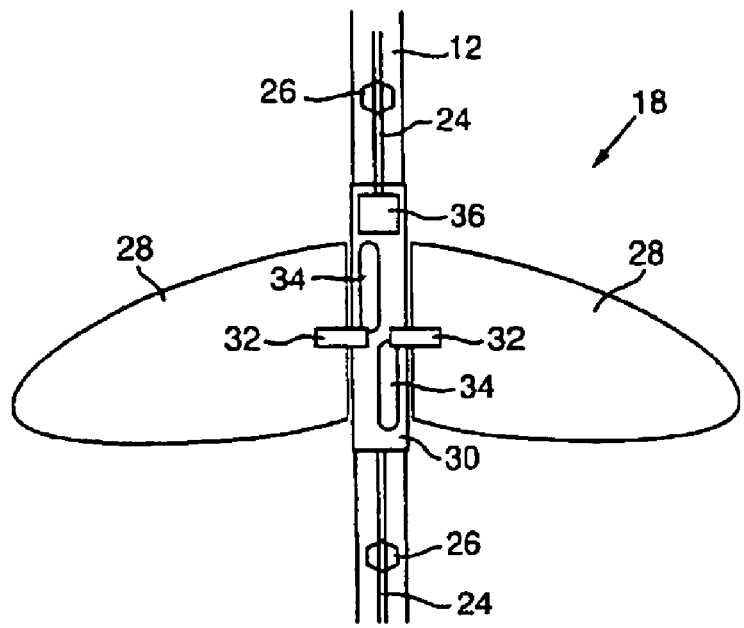
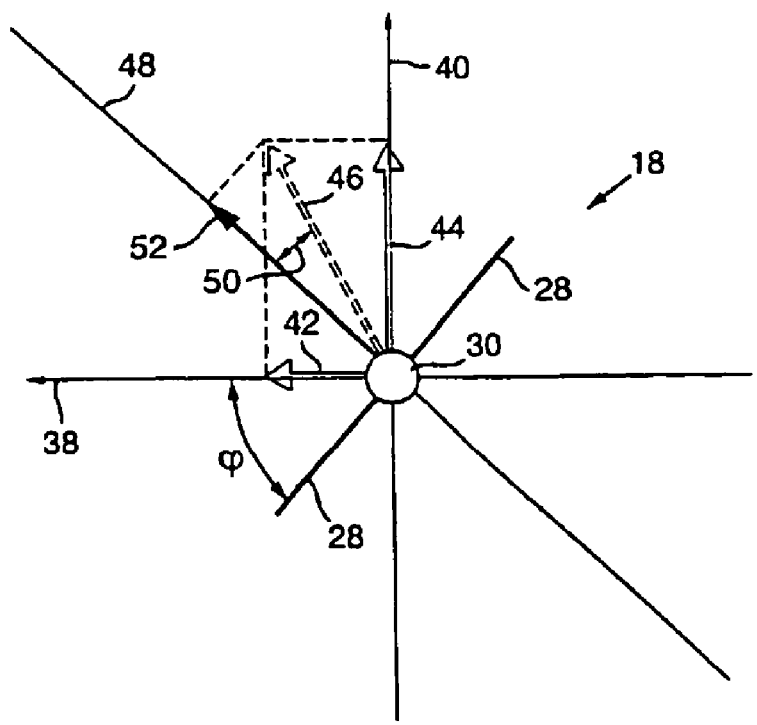

CONTROL SYSTEM FOR POSITIONING OF A MARINE SEISMIC STREAMERS

CROSS-REFERENCE TO RELATED APPLICATIONS

Applicant claims priority under 35 U.S.C. § 120 from Ser. No. 11/070,614, filed Mar. 2, 2005, now U.S. Pat. No. 7,080,607, which was a continuation of parent application Ser. No. 09/787,723, filed Jul. 2, 2001, now U.S. Pat. No. 6,932,017, which was a 35 U.S.C. § 371 national stage filing from Patent Cooperation Treaty application number PCT/IB99/01590, filed Sep. 28, 1999, which in turn claimed priority from Great Britain patent application number 9821277.3, filed Oct. 1, 1998, from which Applicant claims foreign priority under 35 U.S.C. § 119, all of which are incorporated herein by reference. This application is also related to co-pending application Ser. Nos. 11/454,352 and 11/454,349, filed simultaneously herewith, which also are both incorporated herein by reference.

BACKGROUND OF THE INVENTION

This invention relates generally to systems for controlling seismic data acquisition equipment and particularly to a system for controlling a marine seismic streamer positioning device.

A marine seismic streamer is an elongate cable-like structure, typically up to several thousand meters long, which contains arrays of seismic sensors, known as hydrophones, and associated electronic equipment along its length, and which is used in marine seismic surveying. In order to perform a 3D marine seismic survey, a plurality of such streamers are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones, and then digitized and processed to build up a representation of the subsurface geology.

The horizontal positions of the streamers are typically controlled by a deflector, located at the front end or "head" of the streamer, and a tail buoy, located at the back end or "tail" of the streamer. These devices create tension forces on the streamer which constrain the movement of the streamer and cause it to assume a roughly linear shape. Cross currents and transient forces cause the streamer to bow and undulate, thereby introducing deviations into this desired linear shape.

The streamers are typically towed at a constant depth of approximately ten meters, in order to facilitate the removal of undesired "ghost" reflections from the surface of the water. To keep the streamers at this constant depth, control devices known as "birds", are typically attached at various points along each streamer between the deflector and the tail buoy, with the spacing between the birds generally varying between 200 and 400 meters. The birds have hydrodynamic deflecting surfaces, referred to as wings, that allow the position of the streamer to be controlled as it is towed through the water. When a bird is used for depth control purposes only, it is possible for the bird to regularly sense its depth using an integrated pressure sensor and for a local controller within the bird to adjust the wing angles to maintain the streamer near the desired depth using only a desired depth value received from a central control system.

While the majority of birds used thus far have only controlled the depth of the streamers, additional benefits can be obtained by using properly controlled horizontally steerable birds, particularly by using the types of horizontally and vertically steerable birds disclosed in our published PCT International Application No. WO 98/28636. The benefits that can be obtained by using properly controlled horizontally steerable birds can include reducing horizontal out-of-position conditions that necessitate reacquiring seismic data in a particular area (i.e. in-fill shooting), reducing the chance of tangling adjacent streamers, and reducing the time required to turn the seismic acquisition vessel when ending one pass and beginning another pass during a 3D seismic survey.

It is estimated that horizontal out-of-position conditions reduce the efficiency of current 3D seismic survey operations by between 5 and 10%, depending on weather and current conditions. While incidents of tangling adjacent streamers are relatively rare, when they do occur they invariably result in prolonged vessel downtime. The loss of efficiency associated with turning the seismic survey vessel will depend in large part on the seismic survey layout, but typical estimates range from 5 to 10%. Simulations have concluded that properly controlled horizontally steerable birds can be expected to reduce these types of costs by approximately 30%.

One system for controlling a horizontally steerable bird, as disclosed in UK Patent GB 2093610 B, is to utilize a manually-operated central control system to transmit the magnitudes and directions of any required wing angle changes to the birds. While this method greatly simplifies the circuitry needed within the bird itself, it is virtually impossible for this type of system to closely regulate the horizontal positions of the birds because it requires manual input and supervision. This becomes a particularly significant issue when a substantial number of streamers are deployed simultaneously and the number of birds that must be controlled goes up accordingly.

Another system for controlling a horizontally steerable bird is disclosed in our published PCT International Application No. WO 98/28636. Using this type of control system, the desired horizontal positions and the actual horizontal positions are received from a remote control system and are then used by a local control system within the birds to adjust the wing angles. The actual horizontal positions of the birds may be determined every 5 to 10 seconds and there may be a 5 second delay between the taking of measurements and the determination of actual streamer positions. While this type of system allows for more automatic adjustment of the bird wing angles, the delay period and the relatively long cycle time between position measurements prevents this type of control system from rapidly and efficiently controlling the horizontal position of the bird. A more deterministic system for controlling this type of streamer positioning device is therefore desired.

It is therefore an object of the present invention to provide for an improved method and apparatus for controlling a streamer positioning device.

An advantage of the present invention is that the position of the streamer may be better controlled, thereby reducing the need for in-fill shooting, reducing the chance of streamer tangling, and reducing the time needed to turn the seismic survey vessel.

Another advantage of the present invention is that noise in marine seismic data associated with streamer position over-correction and streamer positioning errors can be significantly reduced.

SUMMARY OF THE INVENTION

The present invention provides methods and apparatus for controlling the positions of marine seismic streamers in an array of such streamers being towed by a seismic survey vessel, the streamers having respective streamer positioning devices disposed therealong and each streamer positioning device having a wing and a wing motor for changing the orientation of the wing so as to steer the streamer positioning device laterally, said methods and apparatus involving (a) obtaining an estimated velocity of the streamer positioning devices, (b) for at least some of the streamer positioning devices, calculating desired changes in the orientation of their wings using said estimated velocity, and (c) actuating the wing motors to produce said desired changes in wing orientation.

The invention and its benefits will be better understood with reference to the detailed description below and the accompanying figures.

BRIEF DESCRIPTION OF THE DRAWINGS

FIG. 2 is a schematic horizontal cross-sectional view through a marine seismic streamer and an attached streamer positioning device;

FIG. 3 is a schematic vertical cross-sectional view through the streamer positioning device from FIG. 2.

DETAILED DESCRIPTION OF THE INVENTION

Figure 1:
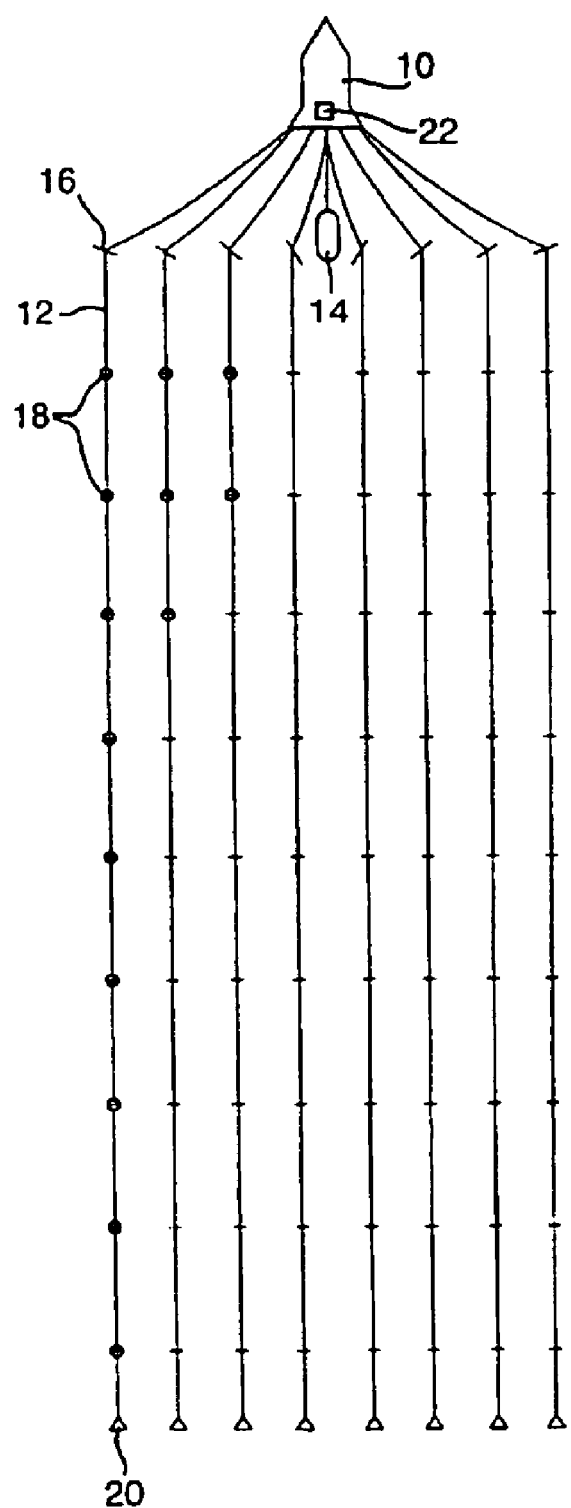
FIG. 1 is a schematic diagram of a seismic survey vessel and associated seismic data acquisition equipment.

In FIG. 1, a seismic survey vessel 10 is shown towing eight marine seismic streamers 12 that may, for instance, each be 3000 meters in length. The outermost streamers 12 in the array could be 700 meters apart, resulting in a horizontal separation between the streamers of 100 meters in the regular horizontal spacing configuration shown. A seismic source 14, typically an airgun or an array of airguns, is also shown being towed by the seismic survey vessel 10. At the front of each streamer 12 is shown a deflector 16 and at the rear of every streamer is shown a tail buoy 20. The deflector 16 is used to horizontally position the end of the streamer nearest the seismic survey vessel 10 and the tail buoy 20 creates drag at the end of the streamer farthest from the seismic survey vessel 10. The tension created on the seismic streamer by the deflector 16 and the tail buoy 20 results in the roughly linear shape of the seismic streamer 12 shown in FIG. 1.

Located between the deflector 16 and the tail buoy 20 are a plurality of streamer positioning devices known as birds 18. Preferably the birds 18 are both vertically and horizontally steerable. These birds 18 may, for instance, be located at regular intervals along the streamer, such as every 200 to 400 meters. The vertically and horizontally steerable birds 18 can be used to constrain the shape of the seismic streamer 12 between the deflector 16 and the tail buoy 20 in both the vertical (depth) and horizontal directions.

In the preferred embodiment of the present invention, the control system for the birds 18 is distributed between a global control system 22 located on or near the seismic survey vessel 10 and a local control system located within or near the birds 18. The global control system 22 is typically connected to the seismic survey vessel's navigation system and obtains estimates of system wide parameters, such as the vessel's towing direction and velocity and current direction and velocity, from the vessel's navigation system.

The most important requirement for the control system is to prevent the streamers 12 from tangling. This requirement becomes more and more important as the complexity and the total value of the towed equipment increases. The trend in the industry is to put more streamers 12 on each seismic survey vessel 10 and to decrease the horizontal separation between them. To get better control of the streamers 12, horizontal steering becomes necessary. If the birds 18 are not properly controlled, horizontal steering can increase, rather than decrease, the likelihood of tangling adjacent streamers. Localized current fluctuations can dramatically influence the magnitude of the side control required to properly position the streamers. To compensate for these localized current fluctuations, the inventive control system utilizes a distributed processing control architecture and behavior-predictive model-based control logic to properly control the streamer positioning devices.

In the preferred embodiment of the present invention, the global control system 22 monitors the actual positions of each of the birds 18 and is programmed with the desired positions of or the desired minimum separations between the seismic streamers 12. The horizontal positions of the birds 18 can be derived, for instance, using the types of acoustic positioning systems described in our U.S. Pat. No. 4,992,990 or in our PCT International Patent Application No. WO 98/21163. Alternatively, or additionally, satellite-based global positioning system equipment can be used to determine the positions of the equipment. The vertical positions of the birds 18 are typically monitored using pressure sensors attached to the birds, as discussed below.

The global control system 22 preferably maintains a dynamic model of each of the seismic streamers 12 and utilizes the desired and actual positions of the birds 18 to regularly calculate updated desired vertical and horizontal forces the birds should impart on the seismic streamers 12 to move them from their actual positions to their desired positions. Because the movement of the seismic streamer 12 causes acoustic noise (both from seawater flow past the bird wing structures as well as cross current flow across the streamer skin itself), it is important that the streamer movements be restrained and kept to the minimum correction required to properly position the streamers. Any streamer positioning device control system that consistently overestimates the type of correction required and causes the bird to overshoot its intended position introduces undesirable noise into the seismic data being acquired by the streamer. In current systems, this type of over-correction noise is often balanced against the "noise" or "smearing" caused when the seismic sensors in the streamers 12 are displaced from their desired positions.

The global control system 22 preferably calculates the desired vertical and horizontal forces based on the behavior of each streamer and also takes into account the behavior of the complete streamer array. Due to the relatively low sample rate and time delay associated with the horizontal position determination system, the global control system 22 runs position predictor software to estimate the actual locations of each of the birds 18. The global control system 22 also checks the data received from the vessel's navigation system and the data will be filled in if it is missing. The interface between the global control system 22 and the local control system will typically operate with a sampling frequency of at least 0.1 Hz. The global control system 22 will typically acquire the following parameters from the vessel's navigation system: vessel speed (m/s), vessel heading (degrees), current speed (m/s), current heading (degrees), and the location of each of the birds in the horizontal plane in a vessel fixed coordinate system. Current speed and heading can also be estimated based on the average forces acting on the streamers 12 by the birds 18. The global control system 22 will preferably send the following values to the local bird controller: demanded vertical force, demanded horizontal force, towing velocity, and crosscurrent velocity.

The towing velocity and crosscurrent velocity are preferably "water-referenced" values that are calculated from the vessel speed and heading values and the current speed and heading values, as well as any relative movement between the seismic survey vessel 10 and the bird 18 (such as while the vessel is turning), to produce relative velocities of the bird 18 with respect to the water in both the "in-line" and the "cross-line" directions. Alternatively, the global control system 22 could provide the local control system with the horizontal velocity and water in-flow angle. The force and velocity values are delivered by the global control system 22 as separate values for each bird 18 on each streamer 12 continuously during operation of the control system.

The "water-referenced" towing velocity and crosscurrent velocity could alternatively be determined using flowmeters or other types of water velocity sensors attached directly to the birds 18. Although these types of sensors are typically quite expensive, one advantage of this type of velocity determination system is that the sensed in-line and cross-line velocities will be inherently compensated for the speed and heading of marine currents acting on said streamer positioning device and for relative movements between the vessel 10 and the bird 18.

FIG. 2 shows a type of bird 18 that is capable of controlling the position of seismic streamers 12 in both the vertical and horizontal directions. A bird 18 of this type is also disclosed in our PCT International Application No. WO 98/28636. While a number of alternative designs for the vertically and horizontally steerable birds 18 are possible, including those utilizing one full-moving wing with ailerons, three full-moving wings, and four full-moving wings, the independent two-wing principal is, conceptually, the simplest and most robust design.

In FIG. 2, a portion of the seismic streamer 12 is shown with an attached bird 18. A communication line 24, which may consist of a bundle of fiber optic data transmission cables and power transmission wires, passes along the length of the seismic streamer 12 and is connected to the seismic sensors, hydrophones 26, that are distributed along the length of the streamer, and to the bird 18. The bird 18 preferably has a pair of independently moveable wings 28 that are connected to rotatable shafts 32 that are rotated by wing motors 34 and that allow the orientation of the wings 28 with respect to the bird body 30 to be changed. When the shafts 32 of the bird 18 are not horizontal, this rotation causes the horizontal orientation of the wings 28 to change and thereby changes the horizontal forces that are applied to the streamer 12 by the bird.

The motors 34 can consist of any type of device that is capable of changing the orientation of the wings 28, and they are preferably either electric motors or hydraulic actuators. The local control system 36 controls the movement of the wings 28 by calculating a desired change in the angle of the wings and then selectively driving the motors 34 to effectuate this change. While the preferred embodiment depicted utilizes a separate motor 34 for each wing 28, it would be also be possible to independently move the wings 28 using a single motor 34 and a selectively actuatable transmission mechanism.

When the bird 18 uses two wings 28 to produce the horizontal and vertical forces on the streamer 12, the required outputs of the local control system 36 are relatively simple, the directions and magnitudes of the wing movements required for each of the wings 28, or equivalently the magnitude and direction the motors 34 need to be driven to produce this wing movement. While the required outputs of the local control system 36 for such a two full moving wing design is quite simple, the structure and operation of the overall system required to coordinate control of the device is relatively complicated.

FIG. 3 shows a schematic vertical cross-sectional view through the streamer positioning device shown in FIG. 2 that will allow the operation of the inventive control system to be described in more detail. The components of the bird 18 shown in FIG. 3 include the wings 28 and the body 30. Also shown in FIG. 3 are a horizontal coordinate axis 38 and a vertical coordinate axis 40. During operation of the streamer positioning control system, the global control system 22 preferably transmits, at regular intervals (such as every five seconds) a desired horizontal force 42 and a desired vertical force 44 to the local control system 36.

The desired horizontal force 42 and the desired vertical force 44 are combined within the local control system 36 to calculate the magnitude and direction of the desired total force 46 that the global control system 22 has instructed the local control system to apply to the streamer 12. The global control system 22 could alternatively provide the magnitude and direction of the desired total force 46 to the local control system 36 instead of the desired horizontal force 42 and the desired vertical force 44.

While the desired horizontal force 42 and the desired vertical force 44 are preferably calculated by the global control system 22, it is also possible for the local control system 36 in the inventive control system to calculate one or both of these forces using a localized displacement/force conversion program. This type of localized conversion program may, for instance, use a look-up table or conversion routine that associates certain magnitudes and directions of vertical or horizontal displacements with certain magnitudes and directions of changes in the vertical or horizontal forces required. Using this type of embodiment, the global control system 22 can transmit location information to the local control system 36 instead of force information. Instead of the desired vertical force 44, the global control system 22 can transmit a desired vertical depth and the local control system 36 can calculate the magnitude and direction of the deviation between the desired depth and the actual depth. Similarly, instead of transmitting a desired horizontal force 42, the global control system 22 can transmit the magnitude and direction of the displacement between the actual horizontal position and the desired horizontal position of the bird 18. One advantage to this alternative type of system is that the required vertical force can be rapidly updated as the local control system receives updated depth information from the integrated pressure sensor. Other advantages of this type of alternative system include reducing communication traffic on the communication line 24 and simplifying the programming needed to convert the measured vertical and/or horizontal displacements into corresponding forces to be applied by the birds 18.

When the local control system 36 has a new desired horizontal force 42 and desired vertical force 44 to be applied, the wings 28 will typically not be in the proper orientation to provide the direction of the desired total force 46 required. As can be seen in FIG. 3, the wings 28 introduce a force into the streamer 12 along an axis perpendicular to the rotational axis of the wings 28 and perpendicular to the streamer. This force axis 48 is typically not properly aligned with the desired total force 46 when new desired horizontal and vertical force values are received from the global control system 22 or determined by the local control system 36 and some rotation of the bird 18 is required before the bird can produce this desired total force 46. As can be seen, the force axis 48 is directly related to the bird roll angle, designated in FIG. 3 as φ.

The local control system 36 optimizes the control process by projecting the desired total force 46 onto the force axis 48 (i.e. multiplying the magnitude of the desired total force by the cosine of the deviation angle 50) to produce an intermediate desired force 52 and then adjusting the wing common angle α (the angle of the wings with respect to the bird body 30, or the average angle if there is a non-zero splay angle) to produce this magnitude of force along the force axis. The calculated desired common wing angle is compared to the current common wing angle to calculate a desired change in the common wing angle and the wing motors 34 are actuated to produce this desired change in the orientation of the wings.

A splay angle is then introduced into the wings 28 to produce a rotational movement in the bird body 30 (i.e. to rotate the force axis 48 to be aligned with the desired total force 46). The splay angle is the difference between the angles of the wings 28 with respect to the bird body 30. As the bird body 30 rotates and the force axis 48 becomes more closely aligned with the desired total force 46, the bird roll angle and the bird roll angular velocity are monitored, the splay angle is incrementally reduced, and the common angle is incrementally increased until the intermediate desired force 52 is in the same direction and of the same magnitude as the desired total force. The local control system 36 carefully regulates the splay angle to ensure that the streamer is stable in roll degree of freedom. The calculated common wing angle and the splay angle are also regulated by the local control system 36 to prevent the wings 28 from stalling and to ensure that the splay angle is prioritized.

When using the type of birds described in our published PCT International Application No. WO 98/28636, where the bird 18 is rigidly attached, and cannot rotate with respect to the streamer 12, it is important for the control system to take the streamer twist into account. If this is not taken into account, the bird 18 can use all of its available splay angle to counter the twist in the streamer 12. The bird 18 will then be unable to reach the demanded roll angle and the generated force will decrease. The inventive control system incorporates two functions for addressing this situation; the anti-twist function and the untwist function.

In the anti-twist function, the streamer twist is estimated by weightfunction filtering the splay angle measurements instead of simply averaging the splay angle measurements to improve the bandwidth of the estimation. The anti-twist function engages when the estimated twist has reached a critical value and it then overrides the normal shortest path control of the calculated roll angle. The anti-twist function forces the bird 18 to rotate in the opposite direction of the twist by adding +/−180 degrees to the demanded roll angle. Once the twist has been reduced to an acceptable value, the anti-twist function disengages and the normal shortest path calculation is continued.

Figure 4:
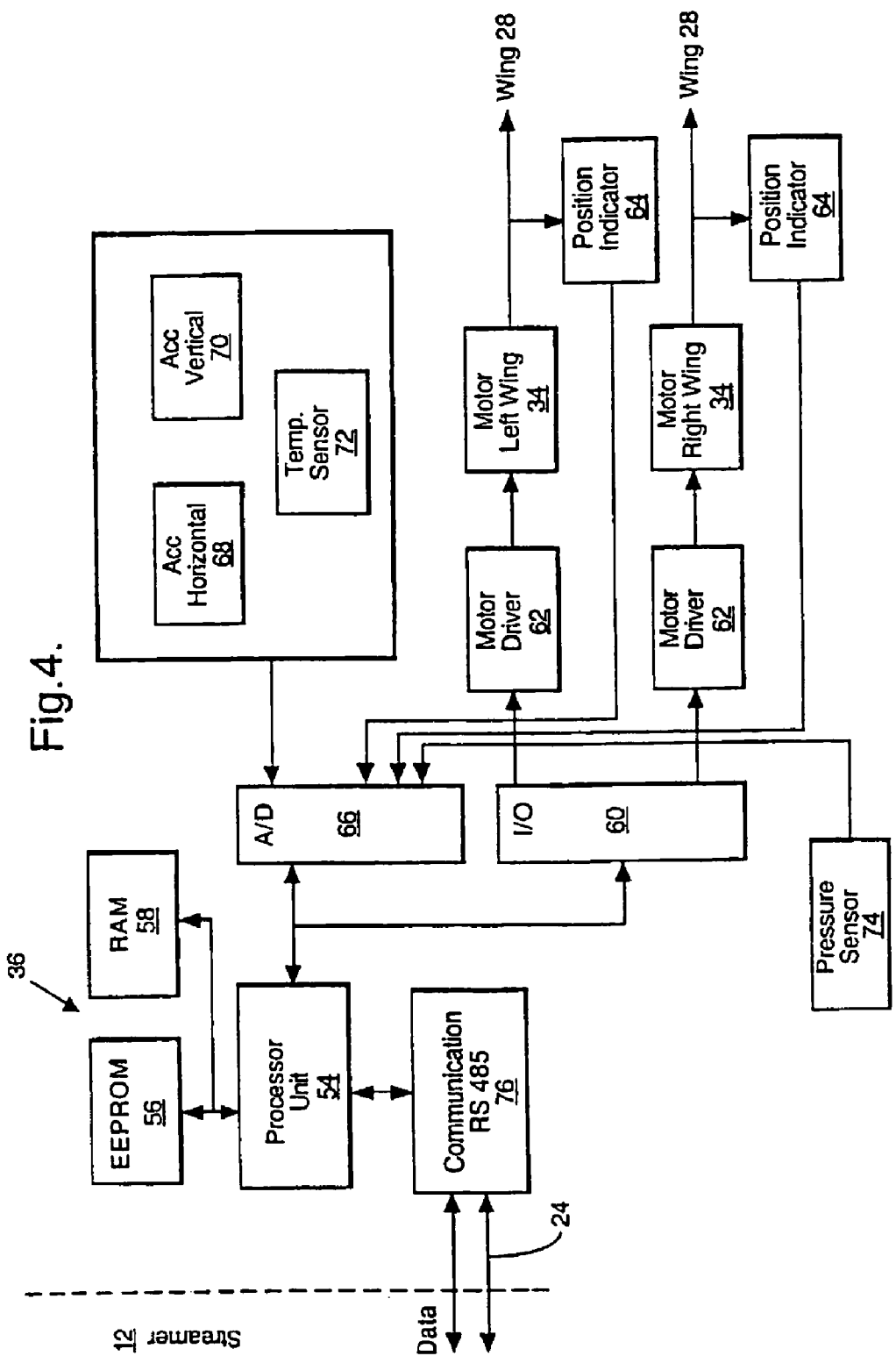
FIG. 4 is a schematic diagram of the local control system architecture of the streamer positioning device from FIG. 2.

The untwist function is implemented by the global control system 22 which monitors the splay angle for all of the birds 18 in each streamer 12. At regular intervals or when the splay angle has reached a critical value, the global control system 22 instructs each local control system 36 to rotate each bird 18 in the opposite direction of the twist. The number of revolutions done by each bird 18 is monitored and the untwist function is disengaged once the twist has reached an acceptable level. FIG. 4 is a schematic diagram of the architecture of the local control system 36 for the bird 18. The local control system 36 consists of a central processor unit 54, having EEPROM 56 and RAM 58 memory, an input/output subsystem 60 that is connected to a pair of motor drivers 62, and an analog to digital conversion unit 66. The motor drivers 62 are connected to and actuate the wing motors 34 to produce the desired change the orientation of the wings 28 with respect to the bird body 30.

The wing motor 34/wing 28 units are also connected to wing position indicators 64 that sense the relative positions of the wings and provide measurements to the analog to digital conversion unit 66 which converts the analog wing position indicator 64 measurements into digital format and conveys these digital values to the central processor unit 54. Various types of wing position indicators 64 can be used, including resistive angle or displacement sensors inductive sensors, capacitive sensors, hall sensors, or magneto-restrictive sensors.

A horizontal accelerometer 68 and a vertical accelerometer 70, placed at right angles with respect to one another, are also connected to the analog to digital conversion unit 66 and these accelerometers convey measurements that allow the central processor unit 54 to determine the roll angle and roll rate of the bird 18. An angular velocity vibrating rate gyro (rategyro) can also be used to measure the roll rate of the bird 18. A temperature sensor 72 is connected to the analog to digital conversion unit 66 to provide temperature measurements that allow the horizontal accelerometer 68 and the vertical accelerometer 70 to be calibrated.

A pressure sensor 74 is also connected to the analog to digital conversion unit 66 to provide the central processor unit 54 with measurements of the water pressure at the bird 18. To calculate an appropriate depth value, the measured pressure values must be filtered to limit the disturbance from waves. This is done in the inventive control system with a weightfunction filter that avoids the large phase displacements caused by mean value filters. Instead of using an instantaneous depth value or simply calculating an average depth value over a given period of time (and thereby incorporating a large phase displacement into the depth value), the inventive control system uses a differentially weighted pressure filtering scheme. First the pressure values are transformed into depth values by dividing the pressure sensor reading by the seawater density and gravitational acceleration. These depth values are then filtered using a weight function filter. Typical incremental weighting functions values range from 0.96 to 0.90 (sample weights of 1.0, 0.9, 0.81, 0.729, etc.) and the filter will typically process depth values received over a period of at least 100 seconds.

The central processor unit 54 is also connected to a RS485 communications unit 76 that allows information to be exchanged between the local control system 36 and the global control system 22 over the communication line 24 that passes through the streamer 12. The RS485 bus may, for instance, utilize Neuron chips that communicate using a Local Operating Network protocol to control the data transfer.

Preferably, the central processor unit 54 and associated components comprise a MicroChip 17C756 processor. This type of microprocessor has very low power requirements, a dual UART on-chip, 12-channel, 10 bit ADC on-chip, 908×8 RAM, 16 k×16 ROM, and 50 digital I/O channels. The software running on the central processor unit 54 will typically consist of two units, the local control unit and the hardware control unit. It is typically not possible to pre-load both of these program units into the EEPROM 56 and it is possible to update these program units without having to open the bird 18. The on-chip memory may thus only initially contain a boot-routine that enables the loading of software units into the external memory via the RS485 communication unit 76. The external program memory (EEPROM 56) will typically be a non-volatile memory so that these program units do not have to be re-loaded after every power down.

The central processor unit 54 must be able to run the local control system software fast enough to secure the sampling frequency needed for effective local bird control. This may mean, for instance, a sample rate of 10 Hz, which may be 10 to 100 times faster than the sample rate of the communications between the global control system 22 and the local control system 36. As discussed above, the central processor unit 54 will also receive data from sensors attached to the bird 18. The sensed values include bird roll angle, bird roll angular velocity (roll rate), the wing angles, and the static pressure of the water. These values are typically delivered to the central processor unit 54 at a sample rate of at least 10 Hz. The following values may be transmitted from the local control system 36 to the global control system 22 using the RS485 communication unit 76: the measured roll angle, the measured roll rate, the measured wing angles, the measured water pressure, the calculated depth, and the calculated wing forces.

The system has been designed with a redundant communication system to increase its overall reliability. The bird 18 will typically have a backup communications channel, such as by overlaying a backup control signal on top of the power line current. This backup communications channel is particularly important because in the event of loss of communications to the bird 18 there would otherwise be no method for instructing the bird 18 to bring the streamer 12 to surface so the defective communications equipment can be repaired or replaced.

In contrast to previous streamer position device control systems, the present control system converts the desired horizontal force 42 and the desired vertical force 44 into a desired roll angle $\phi$ and a desired common wing angle $\alpha$ by deterministic calculations, rather than using an "incremental change/measured response/further incremental change based on measured response" type of feedback control circuit. The desired roll angle $\phi$ can be calculated in the manner discussed in the text describing FIG. 3 above. The magnitude of the force F imparted by the wings 28 along the force axis 48 can, for instance, be deterministically calculated using the following formula:

$$F = 0.5 \rho A C_L (V_{tow} \cos(\alpha) - V_{current} \sin(\alpha))^2$$

where: $\rho$=water density;

A=wing area;

$C_L$=wing lift coefficient;

$\alpha$=common wing angle;

$V_{tow}$=towing velocity; and $V_{current}$=crosscurrent velocity.

A similar deterministic calculation could be made using a calculated coefficient that incorporates the towing velocity of the bird 18. A gain factor GF, for instance, could be calculated as follows:

$$GF = 0.5 \rho A C_L (V_{tow})^2$$

which could be simply multiplied by $\cos(\alpha)^2$ to estimate the force that would be applied for a given common angle.

One of the beneficial elements of the inventive control system is that the desired change in the orientation of the wing 28 is calculated using an estimate of the velocity of the bird 18 rather than simply relying on a feedback-loop type of control system that operates in the same manner regardless of the vessel speed. Because the force produced by wing 28 is proportional to the velocity of the device squared, a much more precise calculation of the desired change in the wing orientation can be made by using an estimate of the device velocity.

The inventive control system is based on shared responsibilities between the global control system 22 located on the seismic survey vessel 10 and the local control system 36 located on the bird 18. The global control system 22 is tasked with monitoring the positions of the streamers 12 and providing desired forces or desired position information to the local control system 36. The local control system 36 within each bird 18 is responsible for adjusting the wing splay angle to rotate the bird to the proper position and for adjusting the wing common angle to produce the magnitude of total desired force required.

The inventive control system will primarily operate in two different control modes: a feather angle control mode and a turn control mode. In the feather angle control mode, the global control system 22 attempts to keep each streamer in a straight line offset from the towing direction by a certain feather angle. The feather angle could be input either manually, through use of a current meter, or through use of an estimated value based on the average horizontal bird forces. Only when the crosscurrent velocity is very small will the feather angle be set to zero and the desired streamer positions be in precise alignment with the towing direction.

The turn control mode is used when ending one pass and beginning another pass during a 3D seismic survey, sometimes referred to as a "line change". The turn control mode consists of two phases. In the first part of the turn, every bird 18 tries to "throw out" the streamer 12 by generating a force in the opposite direction of the turn. In the last part of the turn, the birds 18 are directed to go to the position defined by the feather angle control mode. By doing this, a tighter turn can be achieved and the turn time of the vessel and equipment can be substantially reduced. Typically during the turn mode adjacent streamers will be depth separated to avoid possible entanglement during the turn and will be returned to a common depth as soon as possible after the completion of the turn. The vessel navigation system will typically notify the global control system 22 when to start throwing the streamers 12 out, and when to start straightening the streamers.

In extreme weather conditions, the inventive control system may also operate in a streamer separation control mode that attempts to minimize the risk of entanglement of the streamers. In this control mode, the global control system 22 attempts to maximize the distance between adjacent streamers. The streamers 12 will typically be separated in depth and the outermost streamers will be positioned as far away from each other as possible. The inner streamers will then be regularly spaced between these outermost streamers, i.e. each bird 18 will receive desired horizontal forces 42 or desired horizontal position information that will direct the bird 18 to the midpoint position between its adjacent streamers.

While the embodiment of the inventive control system described above is shown in connection with a "bird" type of streamer positioning device, it will be readily understood that the control system method and apparatus may also be used in connection with streamer positioning devices that are characterized as "deflectors" or steerable "tail buoys" because they are attached to either the front end or the back end of the streamer 12.

The present invention includes any novel feature or novel combination of features disclosed herein, either explicitly or implicitly.

What is claimed is:

1. A method comprising:
   (a) towing an array of streamers each having a plurality of streamer positioning devices there along contributing to steering the streamers;
   (b) controlling the streamer positioning devices with a control system configured to operate in one or more control modes selected from a feather angle mode, a turn control mode, and a streamer separation mode.

2. The method of claim 1 wherein the control mode is the feather angle mode, and the controlling comprises the control system attempting to keep each streamer in a straight line offset from a towing direction by a feather angle.

3. The method of claim 2 comprising inputting the feather angle manually.

4. The method of claim 2 comprising inputting the feather angle using an estimated value based on an average of horizontal forces on the streamer positioning devices.

5. The method of claim 2 comprising setting the feather angle to zero when crosscurrent velocity is very small and desired streamer positions are in alignment with the towing direction.

6. The method of claim 1 wherein the towing comprises ending one pass, turning a towing vessel having the streamers attached thereto while throwing out the streamers before beginning another pass, with the control mode in the turn control mode during the turning and throwing out.

7. The method of claim 6 comprising turning during a 3D seismic survey.

8. The method of claim 6 comprising turning during a line change.

9. The method of claim 6 comprising commanding each streamer positioning device to generate a force in an opposite direction of the turning, and then commanding each streamer positioning device to go to a position defined by the feather angle control mode.

10. The method of claim 6 comprising separating adjacent streamers by depth during the turning mode to avoid possible entanglement during the turning.

11. The method of claim 10 comprising returning adjacent streamers to a common depth after the completion of the turning.

12. The method of claim 6 comprising notifying the control system, via a vessel navigation system, when to start throwing the streamers out, and when to start straightening the streamers.

13. The method of claim 1 wherein the control mode is the streamer separation mode, the control system attempting to minimize the risk of entanglement of the streamers.

14. The method of claim 13 comprising the control system attempting to maximize distance between adjacent streamers.

15. The method of claim 13 comprising separating the streamers in depth.

16. The method of claim 15 wherein the array of streamers comprises two streamers, and comprising positioning the two streamers as far away from each other as possible.

17. The method of claim 15 wherein the array of streamers comprises three or more streamers, the array comprising one port-most streamer, one starboard-most streamer and at least one inner streamer and comprising positioning the port-most and starboard-most streamers as far away form each other as possible.

18. An apparatus comprising:
   (a) an array of streamers each having a plurality of streamer positioning devices there along;
   (b) a control system configured to use a control mode selected from a feather angle mode, a turn control mode, a streamer separation mode, and two or more of these modes.

19. The apparatus of claim 18 wherein the control mode is the feather angle mode, and the controlling comprises the control system attempting to keep each streamer in a straight line offset from a towing direction by a feather angle.

20. The apparatus of claim 19 comprising inputting the feather angle manually.

21. The apparatus of claim 19 comprising inputting the feather angle using an estimated value based on an average of horizontal forces on the streamer positioning devices.

22. The apparatus of claim 19 comprising setting the feather angle to zero when crosscurrent velocity is very small and desired streamer positions are in alignment with the towing direction.

23. The apparatus of claim 18 wherein the towing comprises ending one pass, turning a towing vessel having the streamers attached thereto while throwing out the streamers before beginning another pass, with the control mode in the turn control mode during the turning and throwing out.

24. The apparatus of claim 23 comprising turning during a 3D seismic survey.

25. The apparatus of claim 23 comprising turning during a line change.

26. The apparatus of claim 23 comprising commanding each streamer positioning device to generate a force in an opposite direction of the turning, and then commanding each streamer positioning device to go to a position defined by the feather angle control mode.

27. The apparatus of claim 23 comprising separating adjacent streamers by depth during the turning mode to avoid possible entanglement during the turning.

28. The apparatus of claim 27 comprising returning adjacent streamers to a common depth after the completion of the turning.

29. The apparatus of claim 23 comprising notifying the control system, via a vessel navigation system, when to start throwing the streamers out, and when to start straightening the streamers.

30. The apparatus of claim 18 wherein the control mode is the streamer separation mode, the control system attempting to minimize the risk of entanglement of the streamers.

31. The apparatus of claim 30 comprising the control system attempting to maximize distance between adjacent streamers.

32. The apparatus of claim 30 comprising separating the streamers in depth.

33. The apparatus of claim 32 wherein the array of streamers comprises two streamers, and comprising positioning the two streamers as far away from each other as possible.

34. The apparatus of claim 32 wherein the array of streamers comprises three or more streamers, the array comprising one port-most streamer, one starboard-most streamer and at least one inner streamer and comprising positioning the port-most and starboard-most streamers as far away from each other as possible.

* * * * *